United States Patent [19]

Fossum

[11] Patent Number: 4,878,568
[45] Date of Patent: Nov. 7, 1989

[54] ELECTROMAGNETIC CLUTCH/BRAKE ASSEMBLY

[75] Inventor: Eric R. Fossum, Simsbury, Conn.

[73] Assignee: Inertia Dynamics, Inc., Collinsville, Conn.

[21] Appl. No.: 325,309

[22] Filed: Mar. 17, 1989

[51] Int. Cl.⁴ ............................................. F16D 67/06
[52] U.S. Cl. .................. 192/18 B; 192/12 D; 192/84 C; 192/90
[58] Field of Search ............... 192/12 D, 15, 16, 18 B, 192/90, 84 AA, 84 C, 48.2

[56] References Cited

U.S. PATENT DOCUMENTS

| | | | |
|---|---|---|---|
| 3,003,609 | 10/1961 | Lang | 192/84 C |
| 3,337,013 | 8/1967 | Wrensch | 192/18 B |
| 3,438,471 | 4/1969 | Wrensch | 192/18 B |
| 3,446,322 | 5/1969 | Wrensch | 192/18 B |
| 3,504,773 | 4/1970 | Miller | 192/84 A X R |
| 3,893,191 | 7/1975 | Gold et al. | 192/18 B X R |

Primary Examiner—Rodney H. Bonck
Attorney, Agent, or Firm—McCormick, Paulding & Huber

[57] ABSTRACT

Aligned shafts are coupled by a clutch and brake assembly that includes a single electromagnetic coil and single return spring. The braking torque is reacted through the field structure frame for the coil and an annular rotor acts as a pole piece to shift the frame for disengaging the brake and for engaging the clutch.

5 Claims, 2 Drawing Sheets

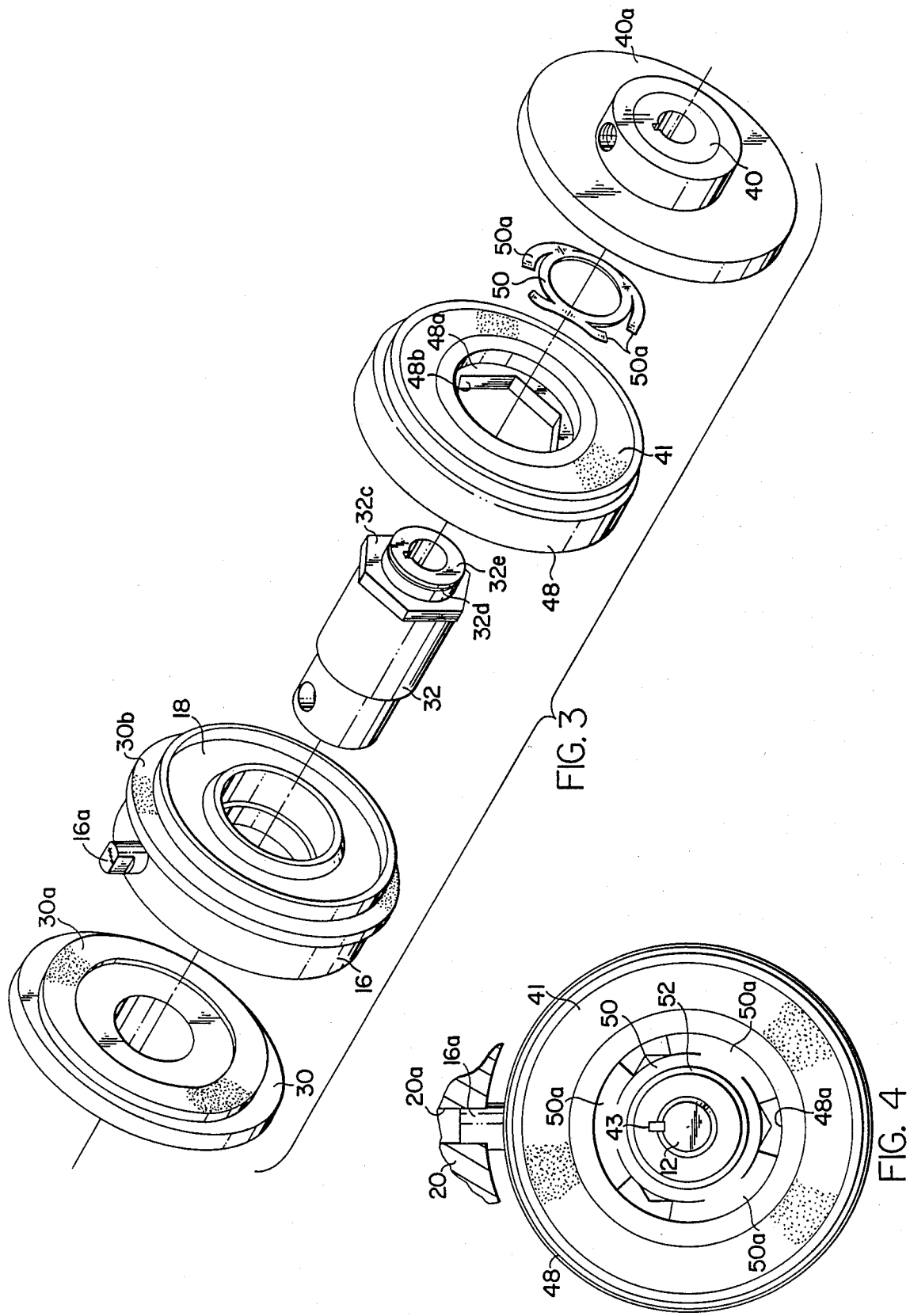

ELECTROMAGNETIC CLUTCH/BRAKE ASSEMBLY

BACKGROUND OF THE INVENTION

This invention relates generally to electromagnetic clutch/brake assemblies and deals more specifically with a configuration for such an assembly that utilizes a single electromagnetic coil to operate both the brake and the clutch, and that utilizes a single return spring to achieve return movement of the clutch and brake to a normal or non-energized condition.

The general purpose of the invention is to provide a clutch/brake assembly wherein engagement of the brake is achieved when the coil is deenergized and wherein the clutch is disengaged. More particularly, when the coil is energized, the clutch engages and the brake disengages, and conversely deenergizing the electromagnetic coil causes the brake to engage as the clutch disengages.

Prior art clutch assemblies of the type that have a single electromagnetic coil for operating both a clutch and brake are known, and typical such units are shown in U.S. Pat. Nos. 3,504,773 and 3,893,191. These prior art constructions depend upon deflection of a relatively weak spring acting between the clutch armature and an input hub, and a stronger spring acting on a brake armature to assure engagement of the clutch prior to release of the brake and vice versa. The present invention provides for separation of both clutch and brake with a single electromagnetic coil and single return spring.

SUMMARY OF THE INVENTION

In accordance with the present invention an electromagnetic clutch and brake assembly is provided for coupling aligned input and output shafts. These shafts preferably abut one another and input and output hubs are secured thereto. The input hub defines a clutch armature fixedly mounted therein and the clutch armature defines an annular face fabricated from a magnetic material. The output hub has a flange provided in fixed relation to a sleeve portion, and a frame rotatably receives the sleeve portion. Means is provided for restraining the frame from rotation externally of the assembly while allowing the frame to move at least slightly in the axial direction on the output hub sleeve. An annular pole piece or rotor is provided for rotation with the output hub and is also movably axially between a clutch engaged and a clutch disengaged position. Biasing means urges the rotor and frame toward a flange of the output hub when the coil is deenergized. The pole piece or rotor defines a frictional clutch face and the coil, when energized, urges the clutch pole piece into the engaged position such that the clutch face engages the annular clutch armature face. The biasing means also urges the annular pole piece toward a clutch disengaged position in addition to urging the frame toward a brake engaged position.

One aim of the present invention is to provide not only for a single electromagnetic coil to operate both the brake and clutch, and also to provide a single spring for achieving return movement of the clutch and brake when the electromagnetic coil is not energized. The electromagnetic coil and its associated frame are adapted to move slightly on the output hub in an axial direction but are restrained from rotation so as to react the torque produced by the brake. Braking action is achieved not only between the coil supporting frame structure and the flange on the output hub but also between the annular pole piece and this frame structure.

BRIEF DESCRIPTION OF THE DRAWINGS

FIG. 3 is an exploded view illustrating the various components of the presently preferred embodiment in a series of perspective views.

FIG. 4 is an end view of the embodiment of FIGS. 1 and 2.

DETAILED DESCRIPTION OF THE PREFERRED EMBODIMENT

Figure 2:
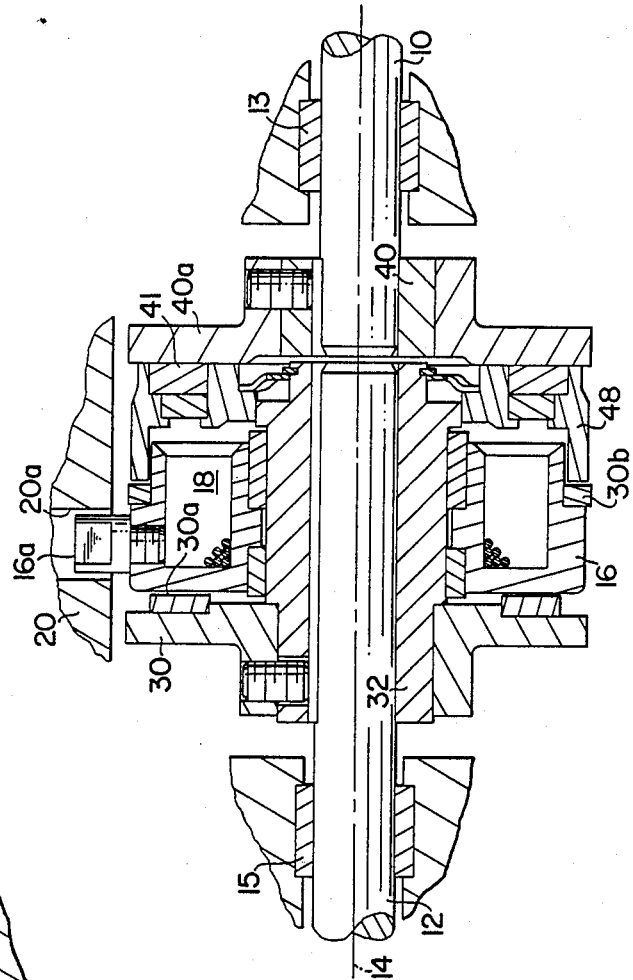
FIG. 2 is a view similar to FIG. 1, but illustrating that embodiment in an energized state.
Figure 1:
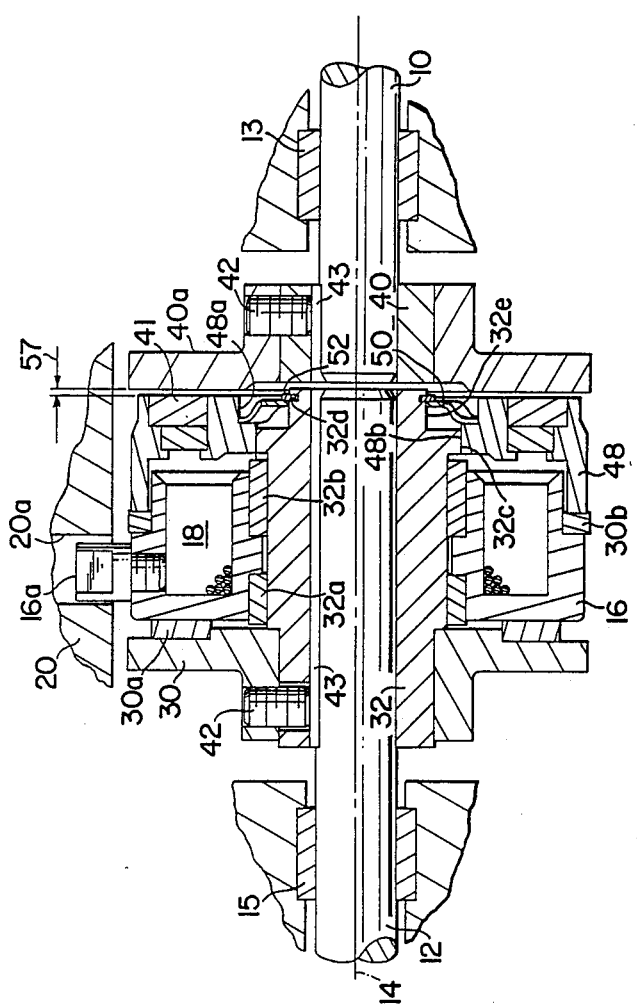
FIG. 1 is a vertical section taken through the presently preferred embodiment of the invention while the coil is in its deenergized state.

Referring now to the drawings in greater detail, FIGS. 1 and 2 illustrate a clutch/brake assembly that embodies the present invention, and that serves to selectively couple an input shaft 10 with an aligned output shaft 12. These shafts are supported in journal bearings or the like by suitable means such as illustrated schematically in these views at 13 and 15. Thus, the shafts 10 and 12 are adapted for rotation on a common axis 14 and so that the ends of the shafts are located adjacent to one another.

Each of the shafts 10 and 12 has an associated hub 40 and 32 respectively secured thereto by set screws and/or key ways as indicated generally at 42 and 43. Thus, the hubs 40 and 32 are provided in predetermined relationship with respect to one another. The output hub 32 has a flange 30, which flange supports a friction ring 30a that rotates with the hub 32. The input hub 40 is also fitted with a flange 40a of magnetic material to achieve operation of the clutch/brake assembly through a single electromagnetic coil 18 and a single return spring 50 to be described.

The output hub 32 also includes at least one, and preferably two axially spaced, journal bearings 32a and 32b which journal bearings rotatably support the output hub 32 and more particularly the sleeve portion thereof as best shown in FIG. 3. These journal bearings 32a and 32b are mounted in a non-rotating support structure frame 16 that houses the electromagnetic coil 18. Actually, the frame structure 16, also shown in FIG. 3, includes a stud 16a that is adapted to be received in a slot 20a defined by fixed structure 20 in order to prevent this frame structure 16 from rotating while at the same time permitting limited axial movement of the frame structure 16.

The electromagnetic coil 18 is shown deenergized in FIG. 1, with the result that a finger spring 50, best shown in FIG. 3, biases an annular pole piece or rotor 48 toward the left in FIG. 1 with the result that the non-rotating structure 16 is also urged toward the left in FIG. 1 to act against the friction ring 30a to achieve a braking action on the output flange 30. In addition to the braking action achieved between the left-hand end of the frame structure 16 and the flange 30 a second friction ring 30b is provided between the frame structure 16 and the rotatable annular pole piece or rotor 48 so that additional braking is achieved in the deenergized condition of the coil 18.

The annular pole piece or rotor 48 includes inner and outer shell portions, and a clutch friction ring 41 is provided in an annular space defined between these inner and outer shell portions to facilitate engagement between the right-hand end of the rotor 48 and the above mentioned flange 40a or clutch armature defined on the input hub 40. As so constructed and arranged energizing of the coil 18 releases the brake mechanism just described so as to permit rotation of the output hub 32 as suggested in FIG. 2. In this position the non-rotatable frame structure 16 moves toward the right slightly so as to permit free rotation of the flange 30 due to the space afforded between the friction ring 30a and the left-hand end of the frame structure 16. Energizing of the coil 18 also achieves closing of the gap 57 between friction ring 41 on the rotor 48 and the surface of clutch armature 40a so as to achieve engagement of the clutch. Thus, the clutch armature 40a does not move relative to the clutch input hub 40 but rather serves as a path for the magnetic flux generated by the coil 18 through the inner and outer shell portions of the rotor 48 mentioned previously.

The magnetic field created in the shell portions of the rotor 48 and the clutch armature 40a pulls the rotor 48 toward the right in FIGS. 1 and 2 for creating an engaged condition for the clutch. A hexagonal portion 32c of the inner sleeve portion of the output hub 32 slidably receives a complementary shaped inner portion 48b of the rotor 48. A boss 32e on the right hand end of the sleeve portion of the hub 32 serves to receive a finger spring or washer 50 that is retained on this boss 32e by retaining ring 52 received in groove 32d. This finger spring 50 has an inner annular configuration not unlike a washer with a central opening for receiving the base 32e on the sleeve portion of the hub 32. The spring further includes tangentially oriented fingers 50a, 50a which fingers engage the right hand end portion 48a of the annular pole piece or rotor 48. Thus, the clutch is normally disengaged by the spring 50 and the same spring 50 also serves to normally engage the above mentioned brake. That is, to engage both friction ring 30a and flange 30 of the output hub 32, and also to engage friction ring 30b between the frame structure 16 and the outer shell of the rotor 48.

In conclusion, the electromagnetic clutch/brake assembly of the present invention has a normal position such that the brake is engaged and the clutch is disengaged. Upon energizing of the electromagnetic coil the brake is electrically disengaged as the clutch engages and this is achieved through the unique configuration for the annular pole piece or rotor 48 in conjunction with the axially movable electromagnetic coil frame structure. Where prior art clutch/brake assemblies have an axially movable clutch armature, the clutch armature 40a of the present invention does not move axially but remains fixed with the input hub 40. The pole piece or rotor 48 moves into engagement with the clutch armature flange 40a as the clutch is engaged. Conversely, when the coil is deenergized the clutch necessarily disengages as the brake engages. The air gap 57 is determined by the spacing between the input hub 40 and the deenergized position for the pole piece 48 is determined by the "set" position for the brake.

I claim:

1. An electromagnetic clutch and brake assembly for coupling input and output shafts that are aligned with one another, said assembly comprising
    an input hub defining a clutch armature fixedly mounted therein, said clutch armature defining an annular face,
    an output hub defining a flange and having a sleeve portion,
    a frame for rotatably receiving said sleeve portion,
    an electromagnetic coil mounted in said frame,
    means for restraining said frame from rotation while allowing said frame to move axially on said output hub,
    biasing means for urging said frame toward said output hub flange when said coil is deenergized,
    an annular pole piece movable axially between a clutch engaged and a clutch disengaged position, said pole piece defining a frictional clutch face, said coil when energized urging said clutch pole piece into said engaged position wherein said clutch face engages said annular clutch armature face, and
    said biasing means also urging said pole piece toward said clutch disengaged position and said frame toward a brake engaged position.

2. The combination of claim 1 wherein said biasing means comprises a single spring means acting on said annular pole piece.

3. The combination of claim 2 wherein said single spring means comprises a finger spring with an inner annular portion secured to said output hub and with generally tangentially oriented finger portions engaging said annular pole piece to urge the latter toward its clutch disengaged position.

4. The combination of claim 1 wherein said annular pole piece is slidably received on said output hub for axial movement between said clutch engaged and clutch disengaged positions, said clutch pole piece being rotatable with said output hub.

5. The combination of claim 1 wherein said frame is axially movable on said output hub for movement between brake engaged and brake disengaged positions.

* * * * *